US008205600B2

(12) United States Patent
Hammer et al.

(10) Patent No.: US 8,205,600 B2
(45) Date of Patent: Jun. 26, 2012

(54) APPARATUS AND SYSTEM FOR THE PRODUCTION OF OZONE FOR AN INTERNAL COMBUSTION ENGINE

(75) Inventors: Leslie G. Hammer, Granby, CT (US); Gabor Nemeth, Vienna (AT); George Mismas, Hamden, CT (US)

(73) Assignee: Oxitron Technologies, LLC, Lake Worth, FL (US)

( * ) Notice: Subject to any disclaimer, the term of this patent is extended or adjusted under 35 U.S.C. 154(b) by 0 days.

(21) Appl. No.: 12/909,987

(22) Filed: Oct. 22, 2010

(65) Prior Publication Data

US 2011/0030625 A1 Feb. 10, 2011

Related U.S. Application Data

(63) Continuation-in-part of application No. 11/977,523, filed on Oct. 24, 2007, now abandoned, and a continuation-in-part of application No. 12/589,426, filed on Oct. 23, 2009.

(51) Int. Cl.
F02M 26/00 (2006.01)
(52) U.S. Cl. .................................................... 123/539
(58) Field of Classification Search ........... 123/536–539
See application file for complete search history.

(56) References Cited

U.S. PATENT DOCUMENTS

| 1,333,836 | A |   | 3/1920  | Csanyi        |         |
|-----------|---|---|---------|---------------|---------|
| 1,725,661 | A |   | 8/1929  | McPartland    |         |
| 2,146,265 | A | * | 2/1939  | Moore, Jr.    | 123/294 |
| 4,065,919 | A |   | 1/1978  | Eknayan       |         |
| 4,308,844 | A |   | 1/1982  | Persinger     |         |
| 4,434,771 | A |   | 3/1984  | Slomnicki     |         |
| 4,519,357 | A |   | 5/1985  | McAllister    |         |
| 5,010,869 | A |   | 4/1991  | Lee           |         |
| 5,487,874 | A | * | 1/1996  | Gibboney, Jr. | 422/186.03 |
| 5,913,809 | A |   | 6/1999  | Erlichman     |         |
| 5,977,716 | A |   | 11/1999 | Motouchi      |         |
| 6,305,363 | B1 |  | 10/2001 | Klomp         |         |
| 6,463,917 | B1 |  | 10/2002 | Silver        |         |
| 7,341,049 | B2 |  | 3/2008  | Clack         |         |
| 2005/0016507 | A1 | | 1/2005 | Tamol         |         |
| 2005/0126550 | A1 | * | 6/2005 | Varasundharosoth et al. | 123/539 |
| 2006/0254264 | A1 | * | 11/2006 | Takenaka et al. | 60/297 |
| 2007/0012300 | A1 | | 1/2007 | Clack         |         |
| 2008/0305239 | A1 | | 12/2008 | Witteveen     |         |
| 2009/0095266 | A1 | | 4/2009 | Burmenko      |         |
| 2009/0120415 | A1 | | 5/2009 | Clack         |         |

FOREIGN PATENT DOCUMENTS

| JP | 08-283005 | 10/1996 |
| JP | 2000-018107 | 1/2000 |
| WO | WO 02-42629 | 5/2002 |

* cited by examiner

Primary Examiner — M. McMahon
(74) Attorney, Agent, or Firm — DeLio & Peterson, LLC; Thomas E. Ciesco

(57) ABSTRACT

An apparatus for the production of ozone for an internal combustion engine comprising a non-conductive shell having a first and second opening which allows air to flow therethrough and first and second electrodes disposed inside the shell. The first electrode is spaced a distance from the second electrode, the first electrode having a smaller diameter than, and being aligned axially within the second electrode. The first electrode permits air to flow therethrough. A high voltage source is connected to the first and second electrode, the high voltage source capable of producing a voltage differential on the first and second electrodes sufficient to cause the production of ozone. A change from oxygen to ozone occurs in the air flowing through the apparatus. The shell is preferably cylindrical.

19 Claims, 7 Drawing Sheets

APPARATUS AND SYSTEM FOR THE PRODUCTION OF OZONE FOR AN INTERNAL COMBUSTION ENGINE

This is a continuation-in-part of pending applications U.S. Ser. No. 11/977,523 filed Oct. 24, 2007 and U.S. Ser. No. 12/589,426 filed on Oct. 23, 2009, both of which are hereby incorporated by reference.

BACKGROUND OF THE INVENTION

1. Field of the Invention

This invention relates to an apparatus and system for generation of ozone for an internal combustion engine capable of increasing fuel efficiency of the engine and reducing emission in the exhaust produced therefrom.

2. Description of Related Art

It is well known that since the development of the internal combustion engine there has always been a desire to improve their performance by improving the miles per gallon achieved when such engines are used in moving vehicles such as trucks, buses and automobiles. More recently there has been a desire to maintain a more complete combustion in the internal combustion engine, especially in the diesel fuel engine, and eliminate such unhealthy emissions such as non-combusted fuel and fuel particles, carbon monoxide, nitrogen oxides and ozone.

Although there have been many advances in the use of ozone, such as U.S. Pat. Nos. 1,333,836 and 1,725,661, which primarily address the efficiency, none have been commercially viable. More recently U.S. Pat. Nos. 4,434,771, 4,308, 844, 5,913,809, 6,305,363, 6,463,919, 7,341,049 as well as U.S. Patent Applications 2005/0016507, 2008/0105239, 2009/0095266 and 2009/0120415 have attempted to address both the efficiency and the emissions problems without much success.

In the generation of ozone, air ionization also occurs although ozone generation and air ionization are completely different chemical reactions. Air ionization occurs when an electron attaches to a gas molecule in the air and negatively charges the particle, attracting the gas molecule to nearby positively charged objects such as furniture, walls, ceilings or floors. Ozonation is the addition of an oxygen atom to an oxygen molecule to produce $O_3$ from $O_2$). The ozone molecule is very unstable and easily disposes of one oxygen atom when it reacts to a carbon containing molecule. This is what makes ozone a strong oxidizer. Ozone makes a good bactericide while air ionization has little or no affect on bacteria.

SUMMARY OF THE INVENTION

Bearing in mind the problems and deficiencies of the prior art, it is therefore an object of the present invention to provide an ozone generator adapted to supply a sufficient amount of ozone for an internal combustion engine which increases the fuel efficiency of the internal combustion engine and reduces the emissions emanating therefrom.

It is another object of the present invention to provide an internal combustion engine system with increased fuel efficiency and reduced emissions.

A further object of the invention is to provide an arc-free ozone generating system for use with diesel fueled engines which overcomes the disadvantages found in the prior art.

Still other objects and advantages of the invention will in part be obvious and will in part be apparent from the specification.

The above and other objects, which will be apparent to those skilled in the art, are achieved in the present invention which is directed to an apparatus for the production of ozone for an internal combustion engine. The apparatus comprises a non-conductive shell having a first and second opening which allows air to flow therethrough and first and second electrodes disposed inside the shell. The first electrode is spaced a distance from the second electrode and the first electrode has a smaller diameter than, and is aligned axially within the second electrode, the first electrode permitting air to flow therethrough. At least one of the first and second electrodes may be a cylindrical metal screen mesh and is preferably a brass mesh screen. The apparatus includes a high voltage source connected to the first and second electrode, the high voltage source capable of producing a voltage differential on the first and second electrodes sufficient to cause the production of ozone. A change from oxygen to ozone occurs in the air flowing through the apparatus. The shell is preferably cylindrical.

The apparatus may include a dielectric material disposed between the first and second electrodes. Preferably the dielectric material is Lexan and alternatively the dielectric material may be quartz glass. The second electrode may be a metal sleeve disposed adjacent to the inside surface of the shell and the first electrode may be a metal brush disposed inside the shell. The first electrode may have a metal core with spaced bristles extending radially outward toward the second electrode. The cylindrical metal sleeve and the metal brush are preferably stainless steel. The apparatus may include at least one insulated standoff attached to the cylindrical shell and at least one of the first and second electrodes.

The high voltage source is an electrical circuit capable of converting a low voltage output from a battery to a voltage between about 3,000 volts and about 32,000 volts. The electric circuit is preferably capable of generating a voltage differential at a frequency between 300 and 3,000 Hertz.

The second opening may be attached to the air intake of an internal combustion engine. Alternately, the second opening is attached to an air intake of a turbo fan wherein an outlet of the turbofan is attached to an air intake of an internal combustion engine. The first opening may be attached to a filter housing which includes a filter element therein. The apparatus may include an internal combustion engine having an air intake and an exhaust outlet wherein the cylindrical shell second opening is attached to the air intake of the internal combustion engine.

Another aspect of the present invention is directed to a method of delivery of ozone into an internal combustion engine. The method comprises providing an internal combustion engine having an air intake and an exhaust outlet and providing an ozone generator. The ozone generator includes a non-conductive shell having a first and second opening which allows air to flow therethrough and first and second electrodes disposed inside the cylindrical shell. The first electrode is spaced a distance from the second electrode and the first electrode permits air to flow therethrough. The method includes providing a high voltage source and connecting the high voltage source to the first and second electrodes, changing oxygen in the air flowing through the apparatus to produce ozone.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-14 of the drawings in which like numerals refer to like features of the invention.

Figure 1:
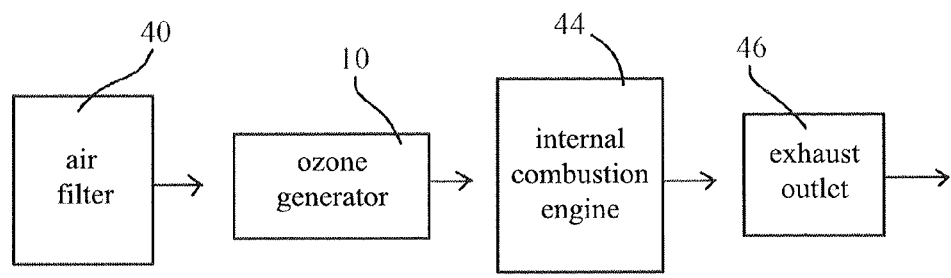
FIG. 1 is a block diagram of the ozone generation system for an internal combustion engine according to the present invention.
Figure 2:
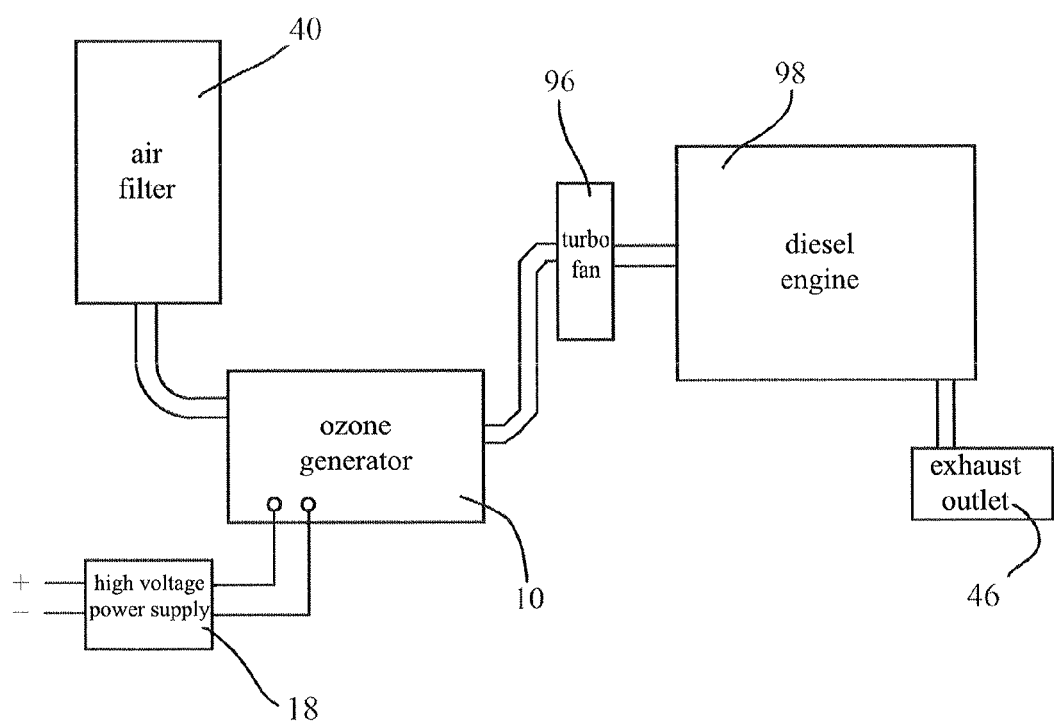
FIG. 2 is a block diagram of the ozone generation system for a diesel engine according to the present invention.

FIGS. 1 and 2 are block diagrams of systems using the ozone generator of the present invention for increasing fuel efficiency and reducing emissions in an internal combustion engine. FIG. 1 includes an air filter 40 which filters incoming atmospheric air and feeds it to an ozone generator 42. The ozone generator 10 converts the oxygen in the air to ozone, which is then fed into the internal combustion engine 44 for combustion with a desired fuel, such as diesel, gasoline, ethanol, natural gas or other liquid or gaseous fuel. The ozone is a stronger oxidation gas than oxygen and allows the fuel to burn more completely, increasing efficiency and passing fewer emissions through the exhaust outlet 46.

FIG. 2 shows the block diagram for a system more specifically for a diesel engine and includes an air filter 90 flowing air into the ozone generator 10 which is powered by a high voltage power supply 18. The flow of air is compressed by a turbocharger 96 which pulls air from the ozone generator 10 and air filter 40 and feeds the compressed air to the diesel engine 98. After the diesel engine burns the fuel, the product of combustion is forced through the exhaust outlet 46.

Figure 3:
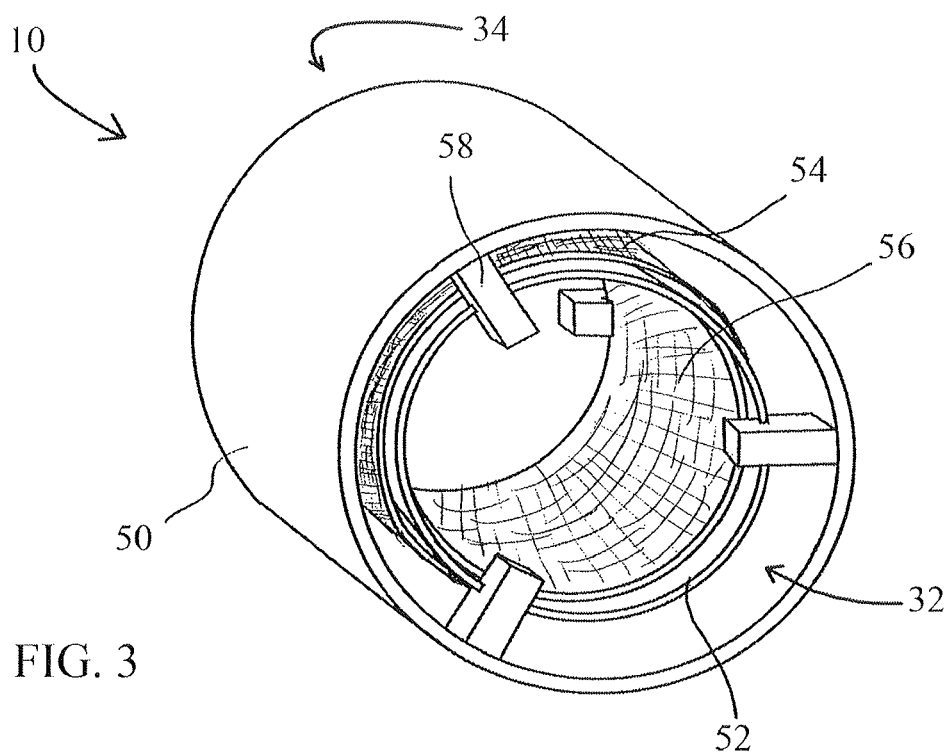
FIG. 3 is a first embodiment of the ozone generator according to the present invention.
Figure 4:
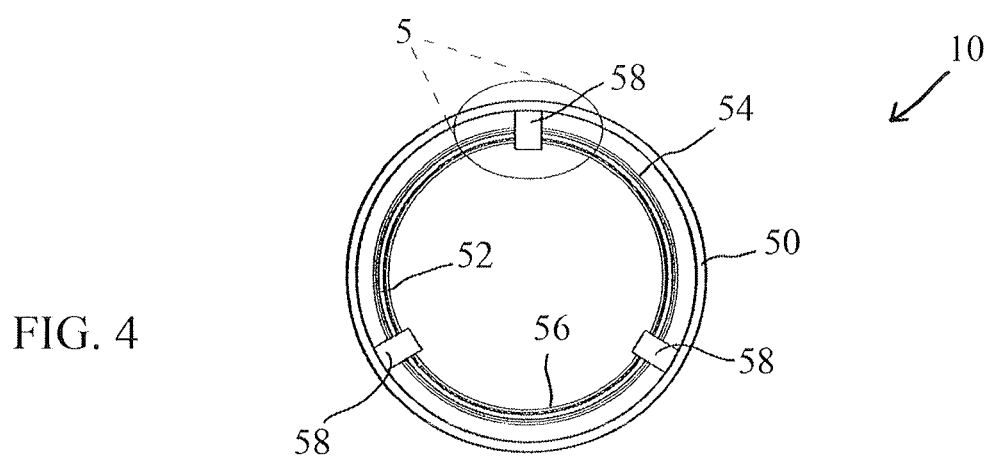
FIG. 4 is a front elevational view of the ozone generator shown in FIG. 3.
Figure 5:
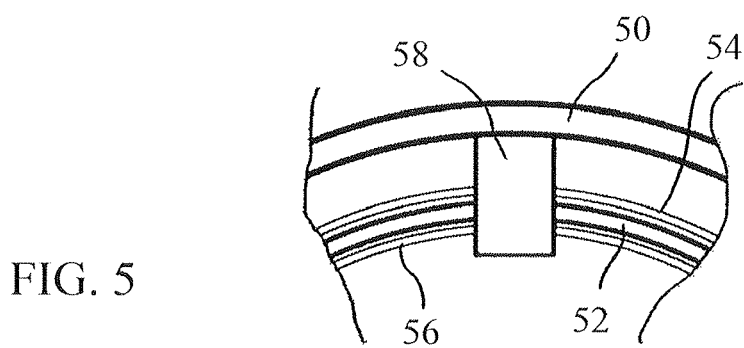
FIG. 5 is an enlarged view of a portion of the ozone generator shown in FIG. 4.

In a first embodiment of the ozone generator 10 shown in FIGS. 3-5, the housing is a rigid non-electrically conductive tube 50, preferably polyvinyl chloride, which includes first and second openings 32, 34 at the opposite ends that allow air to pass through the tube when there is a pressure differential between the first opening 32 and the second opening 34. A cylindrical outer electrode 54 and a cylindrical inner electrode 56 are radially separated by a cylindrical dielectric sleeve 52, and are coaxially disposed inside the non-conductive tube 50. The electrodes 54, 56 are preferably a mesh screen, and more preferably a brass screen. The dielectric sleeve 52 is preferably a polycarbonate such as Lexan or a glass such as quartz glass, both of which have high strength dielectric properties. At least one, and preferably three, short supporting insulator members 58 are attached to and extend inwardly between the non-conductive tube 50 and the dielectric sleeve 52 at spaced intervals adjacent each opening 32, 34. Alternately, the insulator members 58 may be attached to and extend between the non-conductive tube 50 and at least one of the inner electrode 56, outer electrode 54 and dielectric sleeve 52. The insulator members may be Teflon.

The inner electrode 56 has a cylindrical shape and includes an opening which extends from one end of the cylinder to the opposite end whereby air may freely pass through the opening without obstruction. The outer electrode 54 has a larger diameter than, and is coaxially aligned with, the inner electrode. Air may also flow between the inner and outer electrodes as it passes longitudinally through the shell.

When a high voltage differential is placed between the outer electrode 54 and the inner electrode 56, oxygen passing inside the non-conductive tube 50 is converted to ozone by combining a single oxygen atom with an oxygen molecule ($O_2$) to form ozone ($O_3$).

Figure 6:
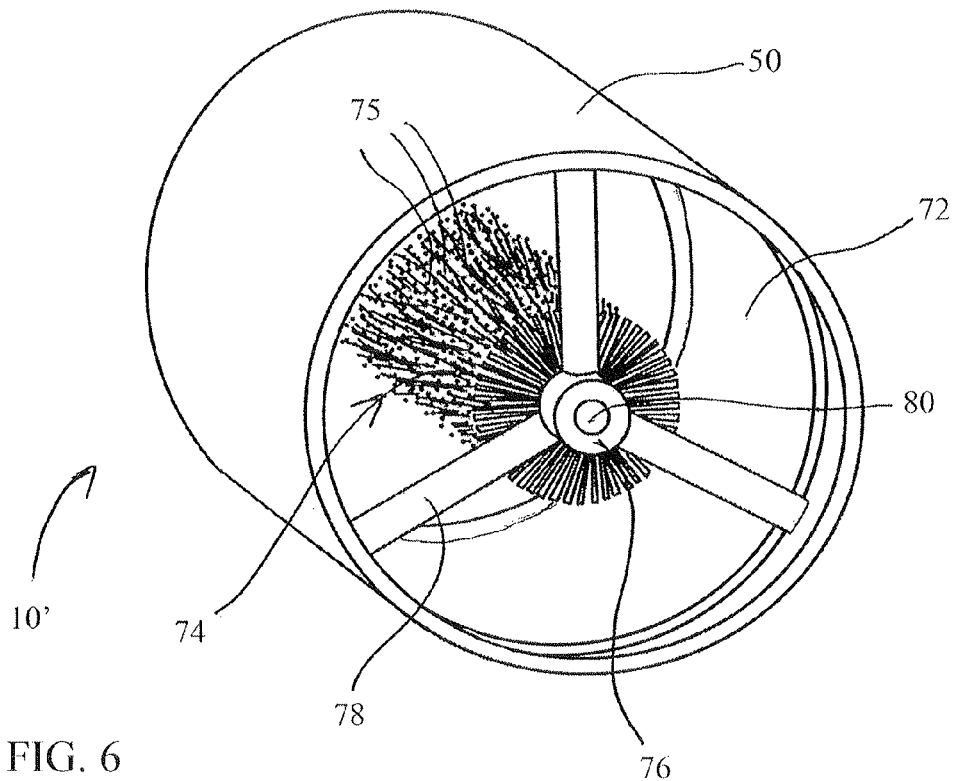
FIG. 6 is a second embodiment of the ozone generator according to the present invention.
Figure 7:
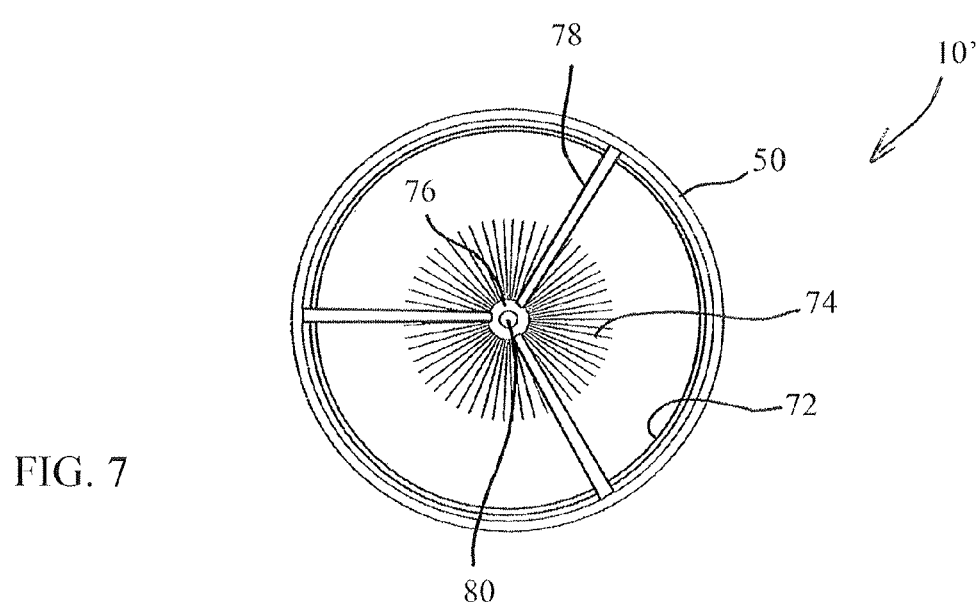
FIG. 7 is a front elevational view of the ozone generator shown in FIG. 6.
Figure 8:
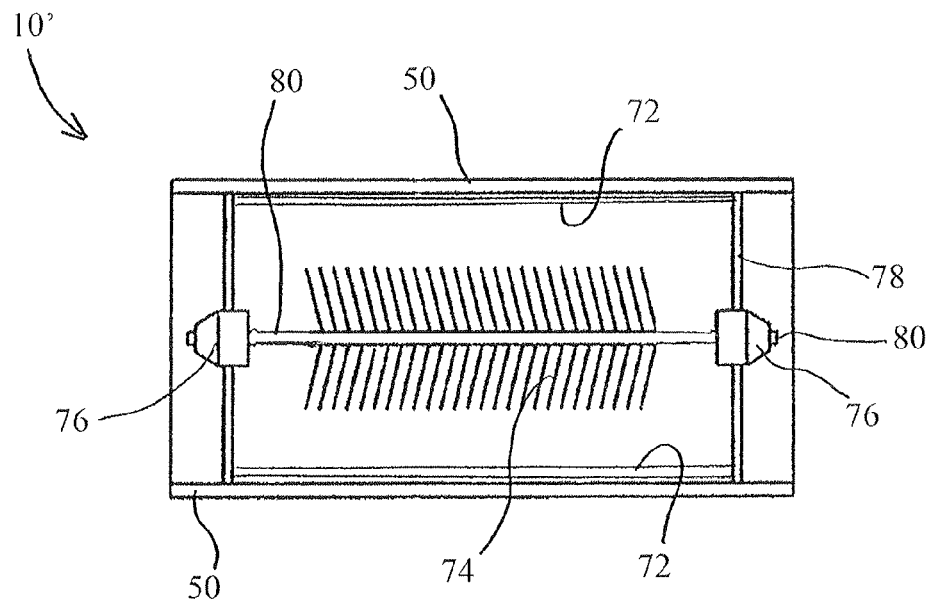
FIG. 8 is a side elevational view of the ozone generator shown in FIG. 6.

In another embodiment of the invention shown in FIGS. 6-8, the housing of an ozone generator 10' is a rigid non-electrically conductive tube 50, preferably polyvinyl chloride, having first and second openings 82, 84 at the opposite ends. A metal wire brush 74 includes a metal core 80 extending axially through the centerline of tube 50 and from which a plurality of spaced wire bristles 75 extend radially outwardly a portion of the distance between the core and the tube 50. The conductive brush is preferably stainless steel. The core 80 extends substantially the length of the tube 50 and is supported at each end by a core support member 76 adjacent each opening 82, 84 of the non-conductive tube 50. Elongated insulator members 78 extend radially between the non-conductive tube 50 and the core support member 76. Tube 50 has an electrically conductive inner surface, shown as a conductive tube 72, preferably aluminum, disposed adjacent the inside surface of the non-conductive tube 50. The conductive brush 74 is cylindrical in shape and the spaced bristles 75 permit air to flow lengthwise through the brush between adjacent bristles, as well as between the free ends of the bristles and conductive tube 72.

When a high voltage differential is placed between the conductive brush 74 and the conductive tube 72, oxygen flowing inside the non-conductive tube 50 is converted to ozone by combining a single oxygen atom with an oxygen molecule ($O_2$) to form ozone ($O_3$).

The above ozone generator embodiments are operationally similar as they both operate by connection to the variable high voltage and an adjustable frequency power supply. For both ozone generator embodiments, a DC to AC inverter converts the 12 VDC battery voltage to at least about 3000 volts AC, and as high as about 32,000 volts AC or more, at a frequency preferably between about 300 and 3,000 Hertz. Both the output voltage and frequency are adjustable. The metal electrodes, either the screen or brush type, are attached to the high voltage output of the inverter which in turn produces ozone from the oxygen in the air passing within the shell.

In order to achieve maximum efficiency in fuel savings and smog reduction, the entire screen tube or brush assembly is preferably installed directly between the existing air filter and the turbo charger of the diesel engine. The incoming filtered clean air is passed through the electrically charged electrode plates, where the oxygen in the air is converted to ozone and subsequently enters the combustion chamber of the diesel engine. The ozone facilitates the diesel fuel to burn more efficiently and minimizes the residual exhaust particulars and gases resulting substantially less environmental pollution.

As the high voltage alternating current is applied to the conductive metal screens, the voltage differential breaks down the dielectric Lexan producing a mixture of ionized air and ozone.

Figure 9:
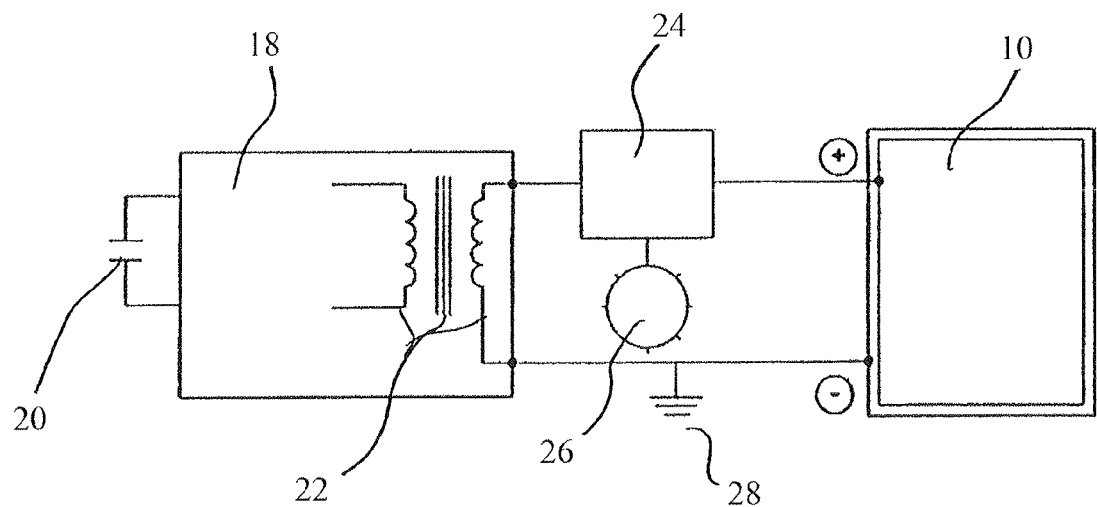
FIG. 9 is a schematic diagram of the high voltage circuit for supplying power to the ozone generator according to the present invention.

FIG. 9 shows the block diagram for the electronic circuit feeding the ozone generator. The circuit includes a 12-volt battery 20 and a power inverter 18 having a high ratio step up transformer. The circuit includes a power detector 24 which monitors the voltage from the power inverter 18 and sends power to illuminate a lamp 26 when voltage is detected. One terminal of the power inverter 18 may be connected to a ground terminal 28. The voltage is then fed to the ozone generator 30.

Figure 10:
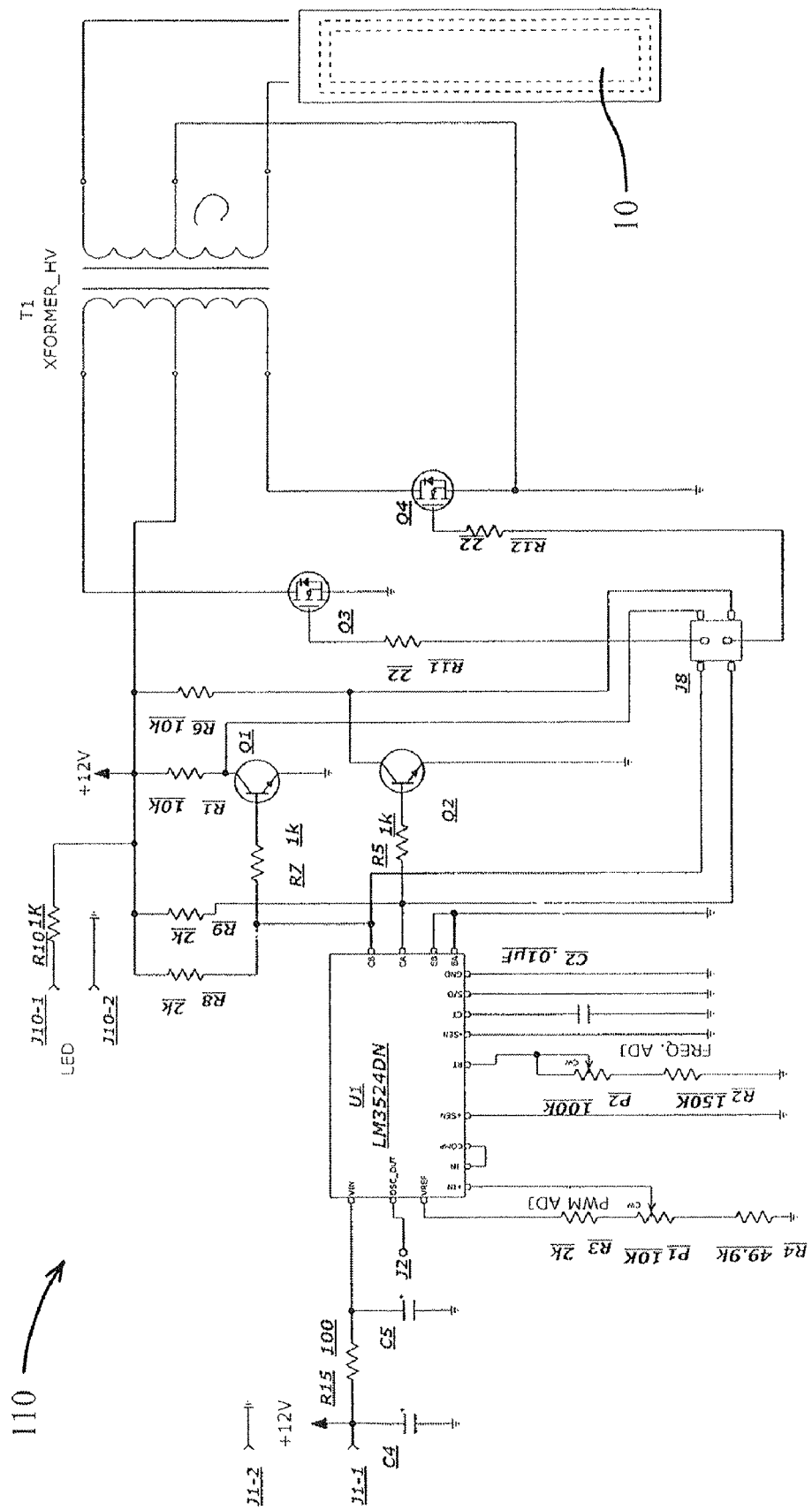
FIG. 10 is a schematic diagram of the components for the circuit shown in FIG. 9.

FIG. 10 shows the schematic for an electric circuit 110 which provides a high voltage alternating semi-square wave to the ozone generator. This voltage, by magnetic action through transformer T1, steps up the 12 volts direct current to as high as 32,000 volts. The output voltage is adjustable from about 3,000 volts to 32,000 volts and the frequency is adjustable from about 300 Hertz to 3,000 Hertz. The circuit 110 may supply the power for either the brush type or the screen type ozone generator.

The circuit 110 uses a pair of transistors Q3, Q4 in a push-pull configuration to produce a voltage across the primary coil of a transformer T1 having a center tap connected to the 12v supply positive terminal. The transformer T1 secondary voltage is applied across the ozone generator terminals and the secondary center tap of the transformer T1 is connected to the ground terminal. This circuit configuration with the center tap of the primary and secondary coils of transformer T1 connected to the terminals of the 12 volt voltage source reduces stress on the transformer coils, allowing for a smaller transformer size compared to a circuit which does not implement the transformer center tap in this way.

Figure 11:
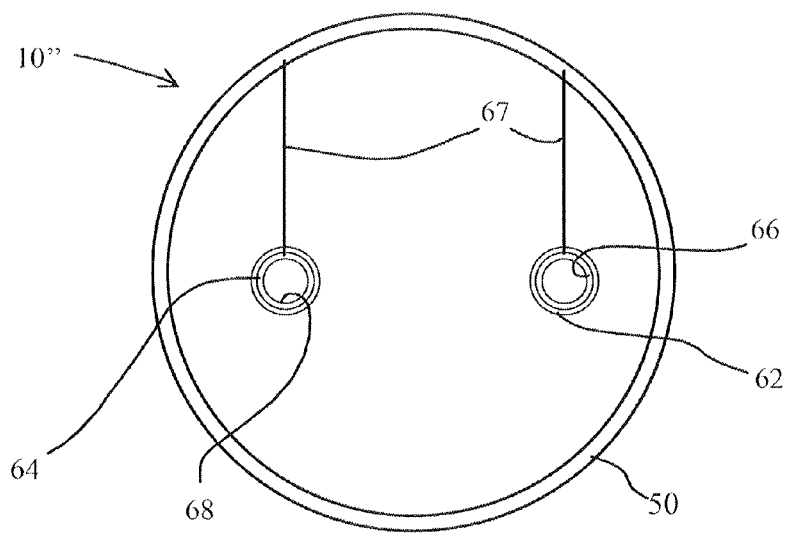
FIG. 11 is a front elevational view of a third embodiment of the ozone generation according to the present invention.
Figure 12:
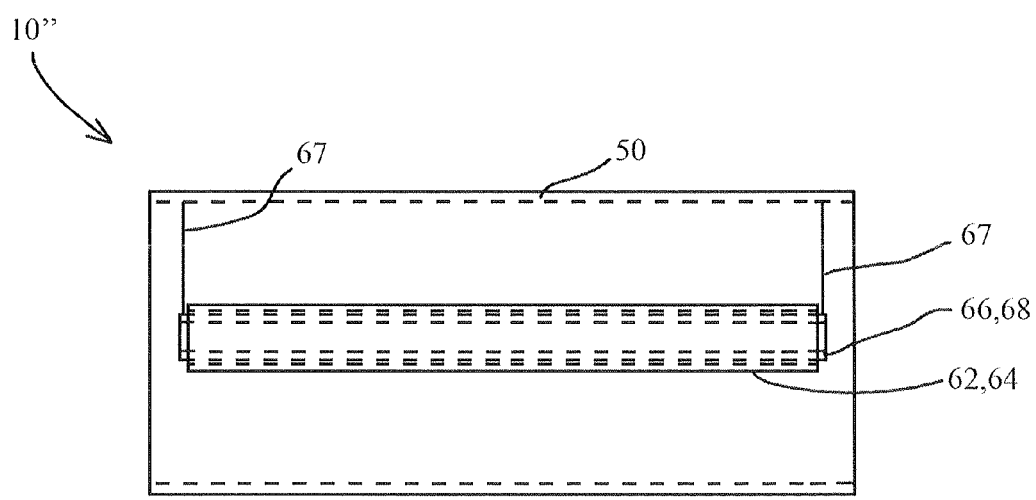
FIG. 12 is a side elevational view of the ozone generation shown in FIG. 11.

In another embodiment shown in FIGS. 11 and 12, the ozone generator 10" consists of a rigid polyvinyl chloride tube housing 50 in which are supported two non-conductive tubes 66, 68 such as Lexan. The non-conductive tubes 66, 68 are supported by a support insulator 67. On the outer surface of the non-conductive tubes 66, 68 are conductive cylinders 62, 64 made of an appropriate metal, preferably brass. The conductive cylinders 62, 64 are connected to the high voltage power supply 18.

Figure 13:
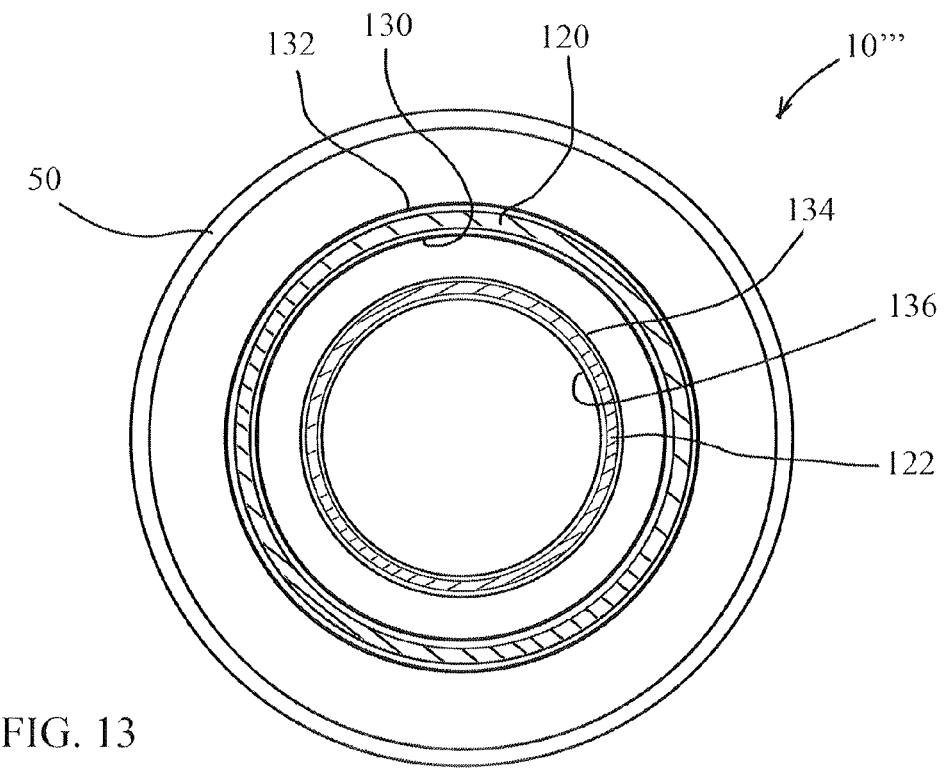
FIG. 13 is a front elevational view of a fourth embodiment of the ozone generation according to the present invention.

FIG. 13 shows another embodiment of the ozone generator 10''' comprising a non-conductive rigid tube 50, a first dielectric tube 120 disposed concentrically inside of the tube 50 and a second dielectric tube 122 disposed concentrically inside of the first dielectric tube 120. On the inside and outside surface of the first dielectric tube 120 are each a metal mesh cylinder 130, 132. On the inside and outside surface of the second dielectric tube 122 are each a metal mesh cylinder 134, 136. The inside mesh cylinders 130, 136 are electrically connected to one terminal of the high voltage power supply and the outside mesh cylinders 132, 134 are electrically connected to the second terminal of the high voltage power supply.

Figure 14:
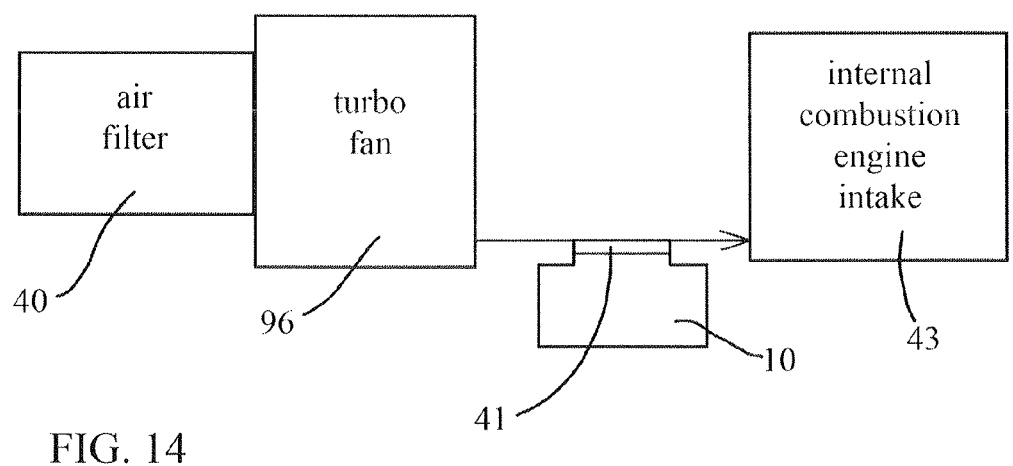
FIG. 14 is a block diagram for an embodiment of the ozone generation system for an internal combustion engine according to the present invention.

FIG. 14 is block diagram showing an alternate configuration of an ozone generation system for an internal combustion engine wherein the output of the ozone generator 10 is fed through a generator filter 41 where it combines with the air flowing through the air filter 40 and turbo charger fan 96 and feeds to the intake 43 of an internal combustion engine.

In the method of delivery of ozone into an internal combustion engine depicted in FIGS. 1 and 2, any of the other embodiments of the ozone generator described herein, 10', 10", 10''', may be used in place of ozone generator 10. In each, a chemical change to oxygen flowing through the ozone generator occurs, producing ozone for the internal combustion engine 44 or 98.

Each of the above embodiments may be tuned to a particular internal combustion engine by providing feedback from the engine speed control or tachometer to the high voltage power supply. The feedback information may control the voltage output, frequency output or voltage and frequency of the power supply in order to control the amount of ozone delivered to the internal combustion engine. As the speed or power output of the engine increases, the power circuit self-adjusts to provide more ozone to the engine since more oxidation of the fuel is necessary. Inversely, as the speed of the engine or the power output decreases, the feedback information is sent to the power supply in order to reduce the generation of ozone. This will prevent over generation of ozone which may adversely affect the fuel efficiency and the emission output of the internal combustion engine.

EXAMPLES OF THE INVENTION

Employing an ozone generator of the type shown in FIGS. 6-8, the wire brush is held in place in the center of the metal tube by several non-conductive, rigid pieces of plastic, in the first embodiment. In this particular embodiment of the invention the metal tube is 8 inches in length, 4 inches in outside diameter and 0.25 inches in thickness. The outside diameter of the wire brush, readily obtained from several commercial sources, is 2 inches. When the power is on and air is flowing from the air purifier through the ozone generator and into the fuel combustion apparatus a significant portion of the oxygen in the air is converted to ozone resulting in additional oxygen which helps convert most of the diesel fuel into useful energy and carbon dioxide and little if any carbon monoxide and leaving little if any unburned carbon in the exhaust. Those persons skilled in the art will be able to construct an ozone generator of the proper size to suit a given engine size and situation as well as possibly using other proper materials of construction. It is also possible to use several ozone generators of the size above in line for larger engines. Larger and smaller ozone generators may be used alone or in combination with one another based on the size and configuration of the internal combustion engine and their requirement for oxygen and ozone.

To demonstrate the usefulness of this device as described above to both improve the combustion and power output of a diesel engine and to show that it positively affects the exhaust composition of a diesel engine, a device in which the tubular shaped wire brush was 8 inches in length was incorporated into the engines of two school buses, one operated by The Truckee Unified School District and the other by Northstar at Tahoe. The School District bus was a 1997, 98 Passenger Bluebird school bus with approximately 155,000 miles on its 3126 Caterpillar motor. That bus traveled an average of 75 miles per day, five days a week for a total mileage of 700 miles during this test. Before the installation of the ozonator device, that bus averaged 7 miles per gallon. After the installation of the device it averaged 10 miles per gallon, a 40% increase in range.

The California Air Resource Board requires School Districts to perform annual opacity tests on the exhaust of the buses. Before the ozonator device was installed the opacity reading was 2.86% but after the device was installed the opacity reading was 1.42% which was about a 50% decrease in the opacity reading. The bus of Northstar of California was driven for 210 miles with almost identical results.

Both the screen and brush type assemblies are separately enclosed in a PVC tubular housing which can be installed using proper adaptor fitting rings in the main air intake line of diesel engine. This allows unobstructed air flow from the existing air filter through the ozone generator. The major portion of the inflow air is converted to ozone. As the ozone mixture is drawn by the turbo fan into the combustion chamber, it combines with the injected fuel. Due to its enriched oxygen content, it facilitates more efficient fuel burning resulting in substantial fuel reduction and reduced exhaust particulars.

Thus, the present invention provides an apparatus and system to supply a sufficient amount of ozone to an internal combustion engine, increasing the fuel efficiency of the internal combustion engine and reducing the emissions emanating therefrom.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus which produces ozone for an internal combustion engine air intake comprising:
   a cylindrical non-conductive shell having a first and second opening which allows air to flow therethrough;
   first and second cylindrical electrodes disposed inside and coaxially aligned with the shell, the first electrode spaced a distance from the second electrode, the first electrode having a smaller diameter than and being aligned axially within the second electrode, the first electrode permitting air to flow therethrough; and
   a high voltage source connected to the first and second electrode, the high voltage source capable of producing a voltage differential on the first and second electrodes is sufficient to cause the production of ozone;
   wherein a change from oxygen to ozone occurs in the air flowing through the apparatus.

2. The apparatus of claim 1 including an internal combustion engine having said air intake and an exhaust outlet wherein the cylindrical shell second opening is attached to the air intake of the internal combustion engine.

3. The apparatus of claim 2 wherein at least one of the first and second electrodes is a cylindrical metal screen mesh.

4. The apparatus of claim 3 wherein the screen mesh is brass.

5. The apparatus of claim 2 further including a dielectric material disposed between the first and second electrodes.

6. The apparatus of claim 5 wherein the dielectric material is Lexan.

7. The apparatus of claim 5 wherein the dielectric material is quartz glass.

8. The apparatus of claim 1 wherein the second electrode is a metal sleeve disposed adjacent to the inside surface of the shell and the first electrode is a metal brush disposed inside the shell, 9. The apparatus of claim 8 wherein the first electrode has a metal core with spaced bristles extending radially outward toward the second electrode.

10. The apparatus of claim 7 wherein the cylindrical metal sleeve is stainless steel.

11. The apparatus of claim 7 wherein the metal brush is stainless steel.

12. The apparatus of claim 1 wherein the high voltage source is an electrical circuit capable of converting a low voltage output from a battery to a voltage between about 3,000 volts and about 32,000 volts.

13. The apparatus of claim 12 wherein the high voltage source is an electrical circuit capable of generating voltage differential at a frequency between 300 and 3,000 Hertz.

14. The apparatus of claim 1 including at least one insulated standoff attached to the cylindrical shell and at least one of the first and second electrodes.

15. The apparatus of claim 1 wherein the second opening is attached to the air intake of an internal combustion engine.

16. The apparatus of claim 1 wherein the first opening is attached to a filter housing which includes a filter element therein.

17. The apparatus of claim 1 wherein the second opening is attached to an air intake of a turbo fan and wherein an outlet of the turbofan is attached to an air intake of an internal combustion engine.

18. A method of delivery of ozone into an internal combustion engine comprising:
   providing an internal combustion engine having an air intake and an exhaust outlet;
   providing an ozone generator comprising;
      a cylindrical non-conductive shell having a first and second opening which allows air to flow therethrough;
      first and second cylindrical electrodes disposed inside and coaxially aligned with the cylindrical shell, the first electrode spaced a distance from the second electrode, the first electrode permitting air to flow therethrough; and
   providing a high voltage source;
   connecting the high voltage source to the first and second electrodes; and
   changing oxygen in the air flowing through the apparatus to produce ozone.

19. An apparatus which produces ozone for an internal combustion engine air intake comprising:
   a cylindrical non-conductive shell having a first and second opening which allows air to flow therethrough;
   first and second cylindrical metal screen mesh electrodes disposed inside and coaxially aligned with the shell, the first electrode spaced a distance from the second electrode, the first electrode having a smaller diameter than and being aligned axially within the second electrode, the first electrode permitting air to flow therethrough;
   a cylindrical dielectric sleeve disposed between the first and second electrodes; and coaxially aligned with the shell; and
   a high voltage source connected to the first and second electrode, the high voltage source capable of producing a voltage differential on the first and second electrodes is sufficient to cause the production of ozone,
   wherein a change from oxygen to ozone occurs in the air flowing through the apparatus.

* * * * *

UNITED STATES PATENT AND TRADEMARK OFFICE
CERTIFICATE OF CORRECTION

| | | |
|---|---|---|
| PATENT NO. | : 8,205,600 B2 | Page 1 of 1 |
| APPLICATION NO. | : 12/909987 | |
| DATED | : June 26, 2012 | |
| INVENTOR(S) | : Leslie G. Hammer et al. | |

It is certified that error appears in the above-identified patent and that said Letters Patent is hereby corrected as shown below:

In the specification:

Column 1, Line 45, delete ")"

Signed and Sealed this
Twenty-seventh Day of November, 2012

David J. Kappos
*Director of the United States Patent and Trademark Office*